(12) United States Patent
Oh et al.

(10) Patent No.: US 8,307,625 B2
(45) Date of Patent: Nov. 13, 2012

(54) CELLULOSE-BASED FILAMENT FOR TIRE CORD, A BUNDLE COMPRISING THE SAME, A TWISTED YARN COMPRISING THE SAME, AND A TIRE CORD COMPRISING THE SAME

(75) Inventors: Young-Se Oh, Busan (KR); Gi-Woong Kim, Daegu (KR); Woo-Chul Kim, Chilgok-gun (KR); Tae-Won Son, Gyeongsan (KR); Si-Min Kim, Daegu (KR)

(73) Assignee: Kolon Industries, Inc., Kwacheon (KR)

( * ) Notice: Subject to any disclaimer, the term of this patent is extended or adjusted under 35 U.S.C. 154(b) by 315 days.

(21) Appl. No.: 12/600,806

(22) PCT Filed: May 25, 2007

(86) PCT No.: PCT/KR2007/002535
§ 371 (c)(1),
(2), (4) Date: Nov. 18, 2009

(87) PCT Pub. No.: WO2008/143375
PCT Pub. Date: Nov. 27, 2008

(65) Prior Publication Data
US 2010/0154377 A1    Jun. 24, 2010

(30) Foreign Application Priority Data
May 23, 2007 (KR) .......................... 10-2007-0050368

(51) Int. Cl.
*D02G 3/22* (2006.01)

(52) U.S. Cl. ........................................... 57/248
(58) Field of Classification Search ............... 57/236, 57/238, 241, 243, 244, 248, 250
See application file for complete search history.

(56) References Cited

U.S. PATENT DOCUMENTS

| | | | | |
|---|---|---|---|---|
| 3,220,173 A | * | 11/1965 | Pitzl | 57/248 |
| 3,439,489 A | * | 4/1969 | Holton et al. | 428/399 |
| 3,691,749 A | * | 9/1972 | McKay | 57/248 |
| 3,846,969 A | * | 11/1974 | McKay | 57/247 |
| RE29,363 E | * | 8/1977 | McKay | 57/247 |
| 4,041,689 A | * | 8/1977 | Duncan et al. | 57/248 |
| 4,492,731 A | * | 1/1985 | Bankar et al. | 428/362 |
| 5,208,106 A | * | 5/1993 | Tung | 428/397 |
| 5,462,790 A | * | 10/1995 | Matsuki et al. | 442/195 |

(Continued)

FOREIGN PATENT DOCUMENTS

JP    2004-168118 A    6/2004

(Continued)

*Primary Examiner* — Shaun R Hurley
(74) *Attorney, Agent, or Firm* — Sughrue Mion, PLLC (57) ABSTRACT

Disclosed are a cellulose-based filament for a tire cord, a bundle including the same, a twisted yarn including the same, and a tire cord including the same. The cellulose-based filament is suitable for use in a tire cord has advantages in that strength deterioration due to twisting is remarkably low and elongation is improved, and thus the fatigue resistance is good.

40 Claims, 7 Drawing Sheets

U.S. PATENT DOCUMENTS

| | | | |
|---|---|---|---|
| 5,486,417 A * | 1/1996 | Hagen et al. | 428/357 |
| 6,701,989 B2 * | 3/2004 | Choi et al. | 152/556 |
| 6,852,413 B2 * | 2/2005 | Lee et al. | 428/393 |
| 6,855,423 B2 | 2/2005 | Fidan et al. | |
| 6,902,804 B2 * | 6/2005 | Kwon et al. | 428/364 |
| 7,000,375 B2 * | 2/2006 | Yanagihara et al. | 57/248 |
| 2004/0126577 A1 * | 7/2004 | Lee et al. | 428/364 |
| 2005/0019564 A1 * | 1/2005 | Kwon et al. | 428/364 |
| 2005/0066646 A1 * | 3/2005 | Kwon et al. | 57/258 |
| 2005/0079348 A1 * | 4/2005 | Lee et al. | 428/364 |
| 2006/0207706 A1 * | 9/2006 | Kwon et al. | 152/451 |

FOREIGN PATENT DOCUMENTS

| | | |
|---|---|---|
| KR | 10-2004-0057550 A | 7/2004 |
| KR | 10-2005-0022964 A | 3/2005 |
| KR | 10-0524795 A | 3/2005 |
| KR | 10-0687048 B1 | 2/2007 |
| KR | 10-2007-0114012 A | 11/2007 |

* cited by examiner

Clock Wise (S-twisted)　　　Counter Clock Wise (Z-twisted)

CELLULOSE-BASED FILAMENT FOR TIRE CORD, A BUNDLE COMPRISING THE SAME, A TWISTED YARN COMPRISING THE SAME, AND A TIRE CORD COMPRISING THE SAME

CROSS REFERENCE TO RELATED APPLICATIONS

This application is a National Stage of International Application No. PCT/KR2007/002535 filed May 25, 2007, claiming priority based on Korean Patent Application No. 10-2007-0050368, filed May 23, 2007, the contents of all of which are incorporated herein by reference in their entirety.

BACKGROUND OF THE INVENTION (a) Field of the Invention

The present invention relates to a cellulose-based filament for a tire cord, a bundle including the same, a twisted yarn including the same, and a tire cord including the same. More particularly, the present invention relates to a filament for a tire cord showing less stress by twisting and superior mechanical properties, a bundle including the same, a twisted yarn including the same, and a tire cord including the same.

(b) Description of the Related Art

Tire cords are used as a framework constituting a tire, and polyester, nylon, rayon, aramid, steel, etc., are used as materials for tire cords.

During driving, tires are exposed to high temperatures due to friction, and at the same time, they must endure the weight of the car. The properties of the tires depend on the properties of the tire cord constituting a framework of the tire.

Therefore, the tire cord needs basic properties such as high tenacity and initial modulus, superior heat resistance, superior fatigue resistance and form stability, and good adhesiveness to rubber of the tire.

Recently, use of a tire cord has been determined by the inherent properties thereof, because most of the well-known tire cords satisfy some of the above properties but do not satisfy all of the properties at the same time.

Generally, tire cords are prepared by processes of preparing a cord yarn by twisting filament fibers together, dipping the same in an adhesive solution, and heat-treating the same to prepare a single cord.

Single cords are then formed into a cord fabric by a weaving process, but the properties of the filament fibers, that is, the starting materials of the cords, tend to deteriorate as the process proceeds.

As an example, according to Korean Patent Publication No. 2004-0057550, when a tire cord is prepared by twisting and dipping lyocell fibers having initial tenacity of 7.5 g/d, the tenacity was deteriorated to 4.99 g/d, which is 33% lower than the initial tenacity of the lyocell fibers. Although this result is different according to the kind of filament fiber, it is a general tendency in a tire cord.

SUMMARY OF THE INVENTION

It is an aspect of the present invention to provide a cellulose-based filament for a tire cord that may lessen the deterioration of the properties during the preparing process of the tire cord and so may show superior properties.

It is another aspect of the present invention to provide a filament bundle for a tire cord including the cellulose-based filaments.

Still another aspect of the present invention is to provide a twisted yarn for a tire cord including the cellulose-based filaments.

Still another aspect of the present invention is to provide a tire cord including the twisted yarn.

In order to attain these objectives, the present invention provides a cellulose-based filament for a tire cord, having an elongation maintaining rate of 120% or more when the filament is made into a dipped cord having an S twisting and Z twisting levels of 470 TPM (twists per meter), respectively, and the elongation of the dipped cord is compared with the elongation of a dipped bundle having no twisting (0 TPM) and including the filament.

Further, the present invention provides a filament bundle for a tire cord including the cellulose-based filament, wherein the total number of filaments included therein is in the range of 200 to 2000.

In addition, the present invention provides a twisted yarn for a tire cord including the cellulose-based filament, wherein the total number of filaments included therein is in the range of 400 to 6000.

In addition, the present invention provides a tire cord including the twisted yarn.

DETAILED DESCRIPTION OF THE PREFERRED EMBODIMENTS

Hereinafter, the present invention is explained in more detail.

Generally, filament fibers having a circular cross-section are used as a yarn for a tire cord. However, the properties of the filament fibers having circular cross-section are deteriorated by the twisting process.

Figure 2:
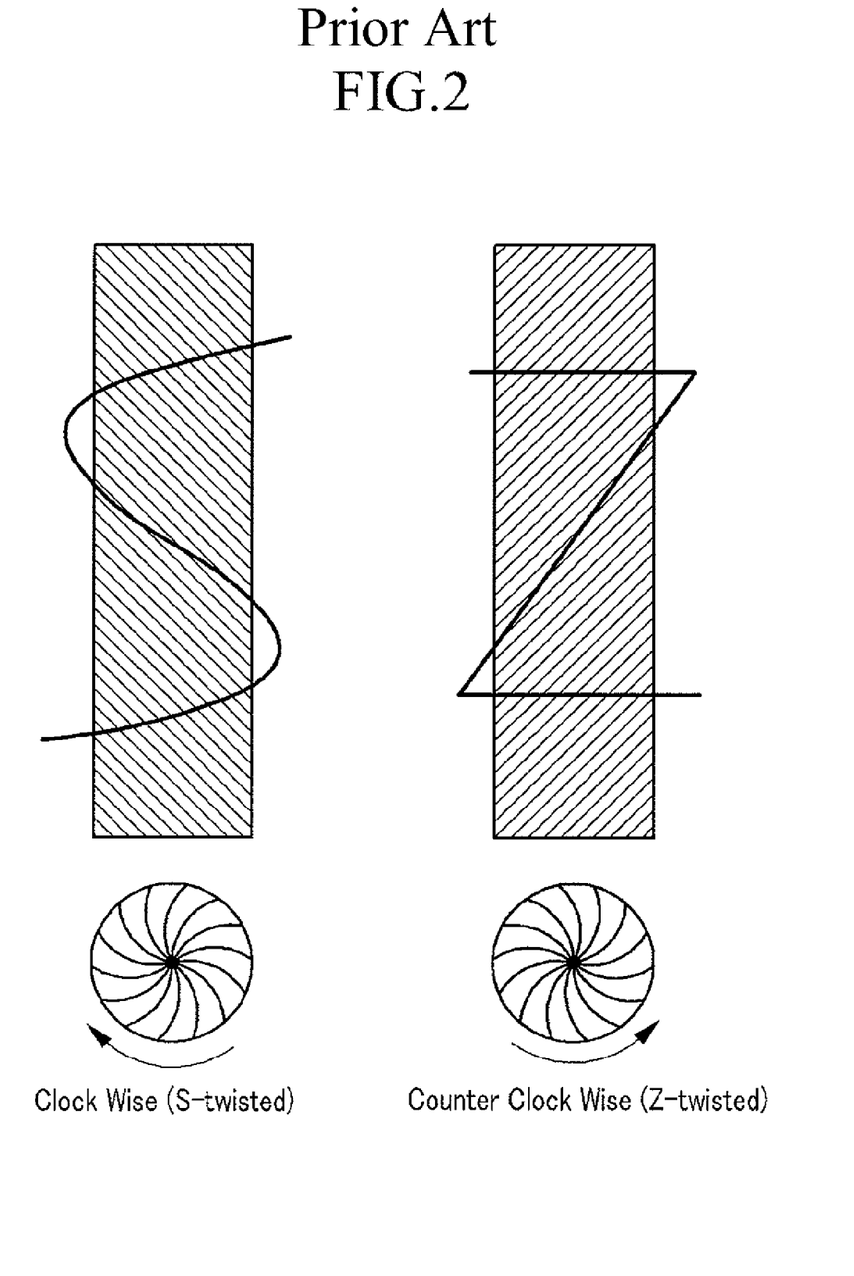
FIG. 2 is a drawing showing the definition of Z twisting and S twisting.

Also, generally, a fiber such as yarn, cord, cable, etc., has a twisting structure formed by a twisting process, and clockwise twisting is called S-twisting and counter-clockwise twisting is called Z-twisting, as shown in FIG. 2 ("*Perspective in Textile Engineering*", Hyongseol press, 1991, Feb. 25, page 216").

Specifically, the tire cord shows changes in tenacity, elongation, fatigue resistance, intermediate elongation, etc., according to the twisting level (TPM: twists per meter), and in particular, the strength deteriorates rapidly as the twisting level (TPM) increases.

Through studies for preventing the property deterioration during the twisting process, the present inventors discovered that the filament fibers suffer many stresses in a spiral direction from the axis of the fibers due to the twisting of the fibers and that the stresses cause the property deterioration, and especially, the tendency worsens as the twisting level increases, and it is more dominantly shown in fibers having a stiff structure of a polymer such as a cellulose fiber.

According to the study of the present inventors, the stresses caused by the twisting may be looser on the surface of the filament fibers, and the stresses caused by the twisting lessen as the surface area is larger when compared with filament fibers having the same cross-sectional area.

The present invention is directed from the studies, and it is a technical feature of the present invention that the cellulose-based filament of the present invention is more suitable than the existing cellulose-based filaments for a tire cord because it shows little strength deterioration and a good elongation improving effect according to the twisting level in the twisting process.

Specifically, it is a technical feature of the present invention that the cellulose-based filament has an elongation maintaining rate of 120% or more, preferably of 140% or more, and more preferably of 160% or more, when the filament is made into a dipped cord having S twisting and Z twisting levels of 470 TPM, respectively, and the elongation of the dipped cord is compared with the elongation of a dipped bundle having no twisting (0 TPM) and including the filament.

The cellulose-based filament of the present invention also has an elongation maintaining rate of 120% or more, preferably of 140% or more, and more preferably of 160% or more, when the filament is made into a dipped cord having S twisting and Z twisting levels of 420 TPM, respectively, and the elongation of the dipped cord is compared with the elongation of a dipped bundle having no twisting (0 TPM) and including the filament.

Furthermore, the cellulose-based filament of the present invention has an elongation maintaining rate of 120% or more, and preferably of 140% or more, when the filament is made into a dipped cord having S twisting and Z twisting levels of 350 TPM, respectively, and the elongation of the dipped cord is compared with the elongation of a dipped bundle having no twisting (0 TPM) and including the filament.

In addition, the cellulose-based filament of the present invention has an strength maintaining rate of 75% or more when the filament is made into a dipped cord having an S twisting and Z twisting level of 470 TPM respectively and the strength of the dipped cord is compared with the strength of a dipped bundle having no twisting (0 TPM) and including the filament, preferably of 80% or more when the filament is made into a dipped cord having an S twisting and Z twisting level of 420 TPM respectively and the strength of the dipped cord is compared with the strength of a dipped bundle having no twisting (0 TPM) and including the filament, and more preferably of 90% or more when the filament is made into a dipped cord having S twisting and Z twisting levels of 350 TPM, respectively, and the strength of the dipped cord is compared with the strength of a dipped bundle having no twisting (0 TPM) and including the filament.

Herein, the elongation maintaining rate and the strength maintaining rate are defined as a percentage of the elongation and the strength of the dipped cord prepared by introducing an adhesive on a twisted yarn prepared by twisting 2 to 3 ply bundles including the cellulose-based filament separately and co-twisting the bundles compared with the elongation and the strength of the dipped bundle prepared by introducing an adhesive on a bundle of which the total number of the cellulose-based filaments is the same as the dipped cord and the twisting level is 0 TPM in the same conditions.

At this time, the total number of the filaments of the bundle including the cellulose-based filament is in the range of 200 to 2000, and the total fineness thereof is in the range of 200 to 3000 d (denier).

Furthermore, the fineness of monofilament of the present cellulose-based filament may be 0.8 to 6 d, and preferably may be 1 to 5 d.

The cellulose-based filament may include rayon or lyocell, and the content of alpha-cellulose included in the filament may be 94 wt % or more, and preferably 96 wt % or more, to secure sufficient mechanical properties such as strength and elongation.

The cross-section shape deviation (MR) of the cellulose-based filament for a tire cord of the present invention represented by the following Equation 1 may be more than 1 and 3 or less, and further may be 1.1 to 3.0, and further may be 1.3 to 2.5. When the MR is 1, it means a substantially circular cross-section filament and therefore property deterioration may occur, and it is possible to secure the sufficient properties for a tire cord without property deterioration of the cellulose-based filament itself:

$$MR = R^2/R^1 \qquad \text{[Equation 1]}$$

wherein MR is a cross-section shape deviation expressed as a modification ratio, $R^1$ is a radius of the maximum inscribed circle of the cross-section of the filament, and $R^2$ is a radius of the minimum circumscribed circle of the cross-section of the filament.

Herein, the maximum inscribed circle is determined as a circle having a maximum area that has an arbitrary center point on the cross-section of the filament and the periphery of the circle does not go out of the cross-section area, and the minimum circumscribed circle is determined as a circle having a minimum area that has an arbitrary center point on the cross-section of the filament and the periphery of the circle does not intrude into the cross-section area.

Hereinafter, the modification ratio mentioned in the present invention means an average value obtained from a photo showing at least 10 cross-sections of the filaments.

Figure 1:
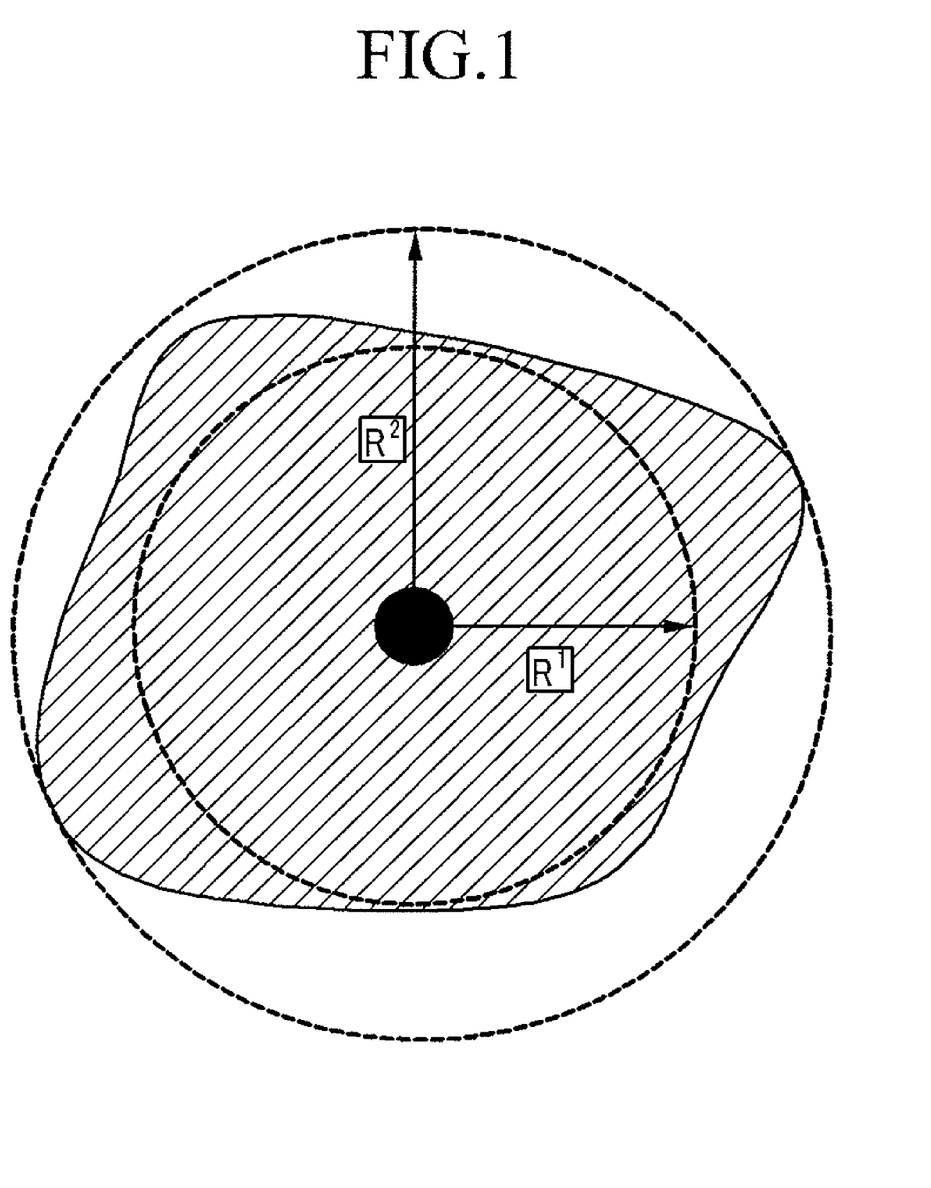
FIG. 1 is an example of a cross-section of a non-circular cross-section filament.

An example of the cross-section of the cellulose-based filament is shown in FIG. 1 to explain $R^1$ and $R^2$ defined in Equation 1. The shape of the cross-section of the non-circular cross-section filament is not limited in the present invention, and thus it may be a random shape, a polygon such as a triangle, a square, or a pentagon, a cruciform, a Y form, or star-shaped, and more preferably it may be a triangle.

The present cellulose-based filament is made into a form of a bundle in which a plurality of filaments are cohered each other before it is to be a form of a tire cord, and the total number of the filaments included in the bundle may be in the range of 200 to 2000 for representing superior strength.

Furthermore, the total fineness of the bundle may be in the range of 200 to 3000 d, and may be in the range of 500 to 2500 d under the necessity.

The bundle forms one ply when it is prepared into a tire cord.

Since the filament bundle includes many filaments, the bundle may include 2 or more kinds of cellulose-based filaments including different polymers or may include the cellulose-based filaments and at least one kind of synthetic polymer filament under the necessity to make up for weak properties of each other. It is possible to control the effect of improving the strength maintaining rate and the elongation maintaining rate by including 2 or more kinds of filaments having different cross-section shape deviations under the necessity, and it is also possible to control the packing state in the cord by including 2 or more kinds of filaments having different cross-sectional shapes under the necessity. As the synthetic polymer filaments, conventional synthetic polymer filaments for a tire cord such as a nylon, a polyester, an aramid, a polyvinylalcohol, and the like may be used.

The filament bundle may be made into a form of a twisted yarn so as to prepare a tire cord, and the present twisted yarn for a tire cord includes the cellulose-based filament wherein the total number of filaments is in the range of 400 to 6000.

Furthermore, the total fineness of the twisted yarn for a tire cord may be in the range of 400 to 9000 d, and may be in the range of 1000 to 7500 d under the necessity.

Herein, since the twisted yarn for a tire cord is made of the filament bundle, it may also include 2 or more kinds of cellulose-based filaments including different polymers, or may include a cellulose-based filament and at least one synthetic polymer filaments in order to make up for the weak properties of each other under the necessity. It is possible to control the effect of improving the strength maintaining rate and the elongation maintaining rate by including 2 or more kinds of filaments having different cross-section shape deviations under the necessity, and it is also possible to control the packing state in the cord by including 2 or more kinds of filaments having different cross-sectional shapes under the necessity, the same as for the filament bundle.

However, since the twisted yarn for a tire cord is prepared by a first twisting process of counter-clockwise twisting (Z twisting) or clockwise twisting (S twisting) the filament bundle and a second twisting process of combining 2 to 3 ply of the first twisted bundles and clockwise co-twisting (S co-twisting) or counter-clockwise co-twisting (Z co-twisting) the same, the first twisted bundle may include 2 or more filaments having different materials, cross-section shape deviations of filaments, or cross-sectional shape of the filaments, and the final twisted yarn may include 2 or more first twisted bundles including the filaments having different materials, cross-section shape deviations, or cross-sectional shapes.

Figure 3:
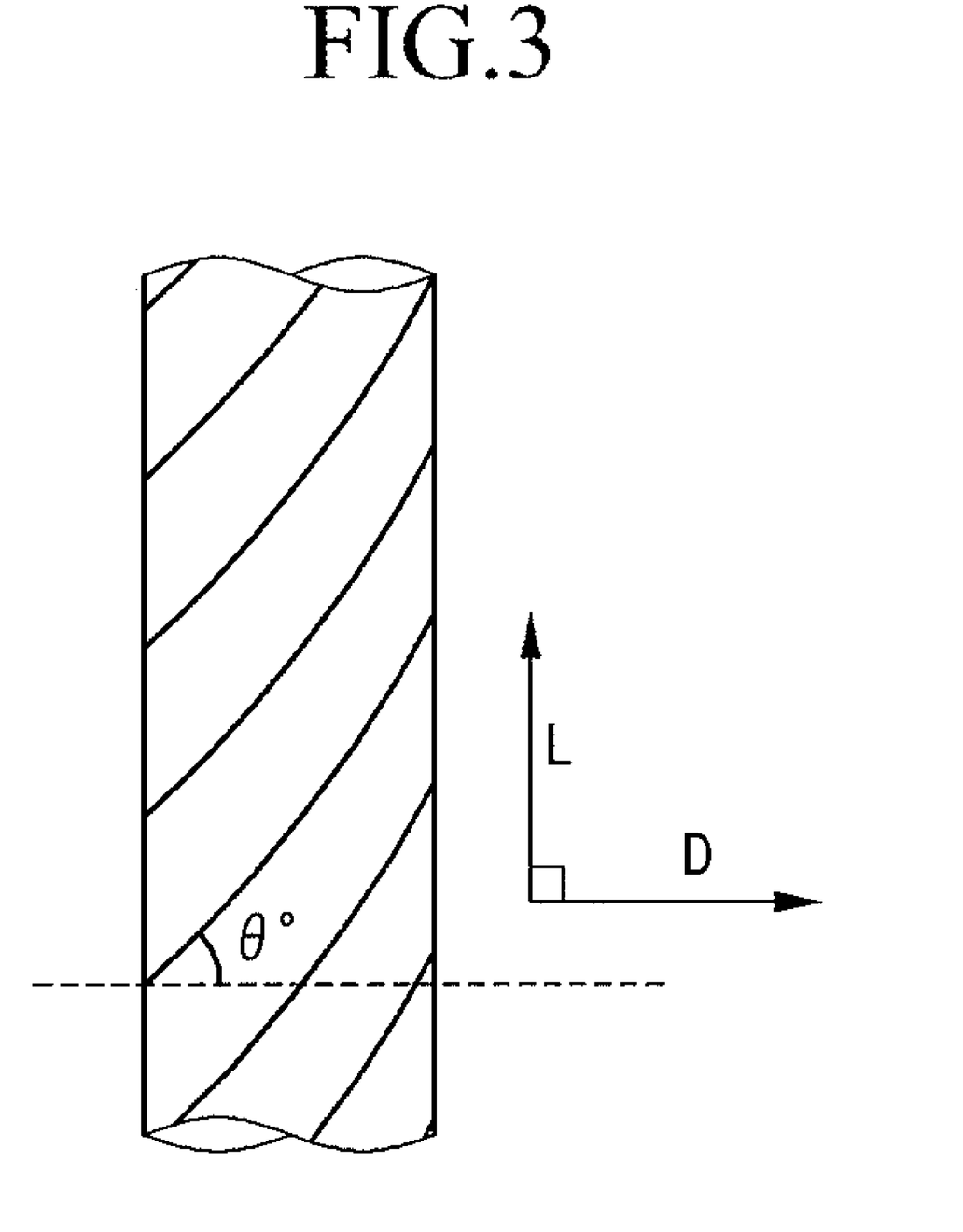
FIG. 3 is a drawing showing the definition of the twisting angle.

As such twisted yarn for a tire cord, the twisting levels of the first Z twisting or S twisting and the second S co-twisting or Z co-twisting may be in the range of 200 to 600 TPM respectively, and the twisted yarn of the present invention has a twisting angle (θ) of 30 to 55° from the perpendicular direction (D) to the vertical direction (L), in the above twisting level, as illustrated in FIG. 3, and thus the twisted yarn of the present invention has a higher twisting level than a twisted yarn including a circular cross-section filament in the same twisting angle, and the elongation maintaining effect of the present invention is specifically good.

The twisted yarn is prepared into a form of a dipped cord by introducing an adhesive on the surface of the twisted yarn, and the characteristics of the yarn are applied to the present tire cord as they are.

In a general tire cord, as the twisting level decreases, the strength thereof increases but the fatigue resistance decreases, while, as the twisting level increases, the fatigue resistance thereof increases but the strength thereof decreases severely, and this tendency appears more obviously in a case of cellulose-based filaments.

However, the tire cord of the present invention includes the filament of which the strength deterioration due to twisting is small and the elongation maintaining rate is good, and specifically the cord shows higher strength than that of a tire cord including circular cross-section filaments in the range of 200 to 600 TPM of each Z and S twisting level (Cable & Cord 3type twister by Allma Co.). Therefore, the twisting level of each of Z and S twisting or each of S and Z twisting of the tire core of the present invention may be in the range of 200 to 600 TPM, respectively.

Furthermore, the tire cord of the present invention including the cellulose-based filaments may have a tensile strength of 12 kgf to 60 kgf, and may also have a tensile strength of 14 kgf to 30 kgf in the range of a 200 to 600 TPM level.

The cellulose-based filament of the present invention may be prepared by a method including the steps of preparing a spinning dope by dissolving cellulose in a solvent mixture of N-methylmorpholine-N-oxide (hereinafter "NMMO") and water, spinning cellulose-based filaments from the spinning dope by using a spinning system with non-circular cross-section nozzles, and cleaning and drying the spun cellulose-based filaments.

Herein, it is preferable to use a spinning dope containing 7 to 18 wt % of cellulose in a solvent mixture containing NMMO and water in a weight ratio of 93:7 to 85:15. The spinning dope may be prepared by swelling cellulose in a solvent mixture containing NMMO and water in a weight ratio of 90:10 to 50:50 and then eliminating water so that the spinning dope contains 7 to 18 wt % of cellulose in a solvent mixture containing NMMO and water in a weight ratio of 93:7 to 85:15. However, the ratio of the solvent mixture and the content of the cellulose are only selected for the most suitable conditions to prepare the cellulose-based filaments, and the present invention is not limited to or by them.

Furthermore, the cross-sectional shape of the cellulose-based filaments and the cross-section shape deviation depend on the shape of the spinning nozzles, and it may be preferable to use Y shaped nozzles for obtaining triangular cross-section fibers because the filaments spun by extrusion expand at the moment of coming out of the spinning nozzles.

The cellulose-based filaments prepared by the above method can be made into a form of a tire cord by the steps of Z twisting, S co-twisting, introducing an adhesive solution for a tire cord, and drying and heat-treating. The twisting level of each Z twisting and S co-twisting may be 200 to 600 TPM, respectively.

As the adhesive solution introduced on the twisted yarn of the present invention, a conventional adhesive solution may be used in the present invention, and preferably an RFL solution may be used. The drying temperature and the heat treating conditions of the adhesive solution follow conventional processing conditions.

Furthermore, in the method of preparing the tire cord of the present invention, the process conditions depends on conventional processing conditions except for using the cellulose-based filament satisfying the specific properties, and thus some addition and subtraction of the conditions are possible under necessity, and the present invention is not specifically limited.

Hereinafter, the present invention is described in further detail through examples. However, the following examples are only for the understanding of the present invention and the present invention is not limited to or by them.

Example 1

A cellulose sheet (V-81, buckeye Ltd.) was introduced into a pulverizer equipped with a 100 mesh filter to prepare cellulose powders having a diameter of 1700 μm or less.

The cellulose powders were swelled in a 50 wt % NMMO aqueous solution, wherein the content of the cellulose in the NMMO aqueous solution was 6.5 wt %, and an anti-oxidant was further introduced into the solution in an amount of 0.01 wt % of the cellulose.

The swelled cellulose slurry was introduced into a kneader where the inner temperature was maintained at 90° C. and the absolute pressure was maintained at 50 mmHg by a rotary valve-type pump with a speed of 16 kg/hour. After dissolving the cellulose completely while eliminating water from the slurry to prepare a spinning dope including 89 wt % of the NMMO aqueous solution, the spinning dope was discharged through a discharging screw, wherein the cellulose content of the discharged spinning dope was 11 wt % and there was no undissolved cellulose particles in the spinning dope.

The cellulose dope was spun by using a die having 1000 nozzles so that the total denier of the prepared filament fibers was 1650 d, wherein the nozzles had a Y form and an area of 0.047 $mm^2$. There was a 30 mm air gap between the nozzles and a solidifying bath.

The NMMO was eliminated from the discharged and solidified filament bundle by a Nelson type roller with sprayed washing water, and the un-dried multi-filament fibers having 170% water content were dried by 3-step drying rolls to prepare lyocell filament fibers. The tension between the first and second drying rolls was controlled to be 0.5 g/d, the tension between the second and third drying rolls was controlled to be 0.8 g/d, and the temperature of the rolls was adjusted to 100° C., 130° C., and 150° C., successively.

Figure 4:
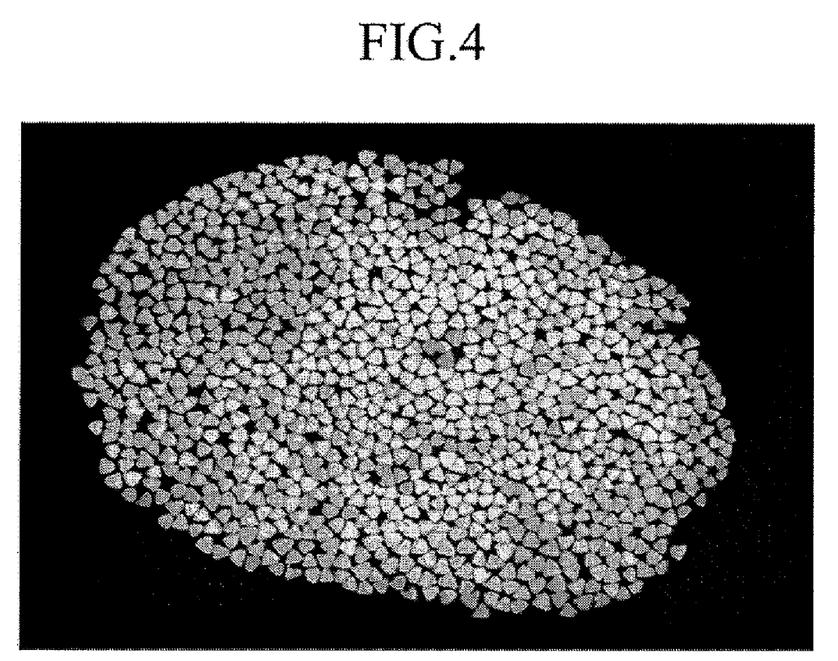
FIG. 4 is a cross-sectional photograph of the triangular cross-section lyocell filament prepared by Example 1.

The total number of lyocell filament fibers prepared by the above method was 1000, the average denier thereof was 1.5 d, the cross-section shape deviation (MR) thereof was 1.44, the dry tenacity thereof was 6.0 g/d, and the breaking elongation thereof was 9%. FIG. 4 is a cross-sectional photograph of the prepared lyocell filaments.

The cross-section shape deviation (MR) of the filaments was calculated by obtaining a cross-section image of the filaments by using scanning electronic microscopy (SEM), and drawing maximum inscribed circles and minimum circumscribed circles of the cross-section of the filaments and measuring radii (R1 and R2) of the circles by using a CAD program (Auto CAD 2002).

Figure 5:
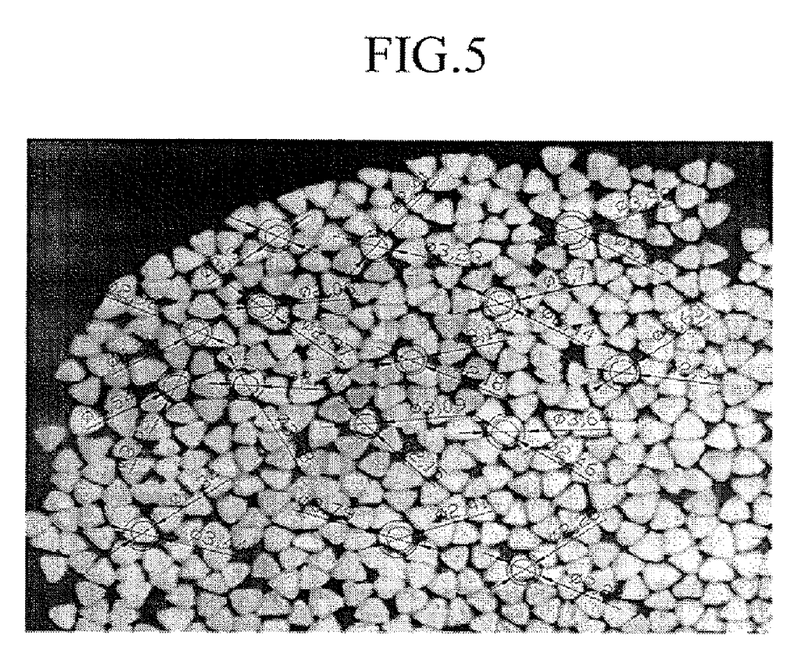
FIG. 5 is a photograph showing an example for measuring the cross-section shape deviation of the non-circular cross-section filament prepared by Example 1.

FIG. 5 is a photograph of the cross-section of the filaments for measuring the MR, and the average value was calculated from at least 10 cross-sections of the filaments for raising reliability of the measurement.

Comparative Example 1

The tire cord was prepared substantially according to the same method as in Example 1, except that the die included 1000 circular nozzles having a diameter of 0.2 mm, and the prepared circular cross-section fibers had an average denier of 1.5 d, dry tenacity of 6.2 g/d, breaking elongation of 8%, and 1000 total filaments.

Example 2

The triangular cross-section lyocell filaments prepared by Example 1 were Z twisted with 350 TPM and then 2 ply of the Z twisted yarns were S co-twisted again with 350 TPM to prepare a raw cord in the Cable & Cord 3type twister, that is, a C.C. Twister, by Allma Co. However, it is also possible to change the twisting direction as S twisting first and Z co-twisting 2 ply of the S twisted yarns second.

The raw cords were dipped into an resorcinol/formaldehyde/latex (RFL) adhesive solution containing resorcinol, formaldehyde, sodium hydroxide, styrene/butadiene/vinylpyridine (15/70/15) rubber, and water so that the pickup rate of the adhesive was 5 wt %, and then the cords were dried for 2 minutes at 150° C. and heat treated for 2 minutes at 240° C.

Example 3

The tire cord was prepared substantially according to the same method as in Example 2, except that each Z and S twisting level was changed to 420 TPM.

Example 4

The tire cord was prepared substantially according to the same method as in Example 2, except that each Z and S twisting level was changed to 470 TPM.

Comparative Example 2

The tire cord having each Z and S twisting level of 350 TPM was prepared substantially according to the same method as in Example 2, except that the circular cross-section filaments were prepared by Comparative Example 1.

Comparative Example 3

The tire cord was prepared substantially according to the same method as in Comparative Example 2, except that each Z and S twisting level was changed to 420 TPM.

Comparative Example 4

The tire cord was prepared substantially according to the same method as in Comparative Example 2, except that each Z and S twisting level was changed to 470 TPM.

The samples of the filaments and the tire cords prepared by Examples 1-4 and Comparative Examples 1-4 were pre-dried for 2 hours at 110° C. so that the moisture thereof was below the official regain, and then placed under standard conditions of KSK 0901 (textile testing room standard state) for 24 hours to be in an equilibrium state.

The strength and elongation of the prepared samples were tested by a slow straining type of UTM of INSTRON Ltd. under the KSK 0412 standard, with conditions of a sample length of 250 mm and a straining speed of 300 mm/min. Furthermore, the filament fibers prepared by Example 1 and Comparative Example 1 were dipped into the adhesive solution according to the same method as above, except that they were not twisted (0 TPM), and the strength and elongation of the prepared samples were measured for reference by the same method as above.

Figure 6:
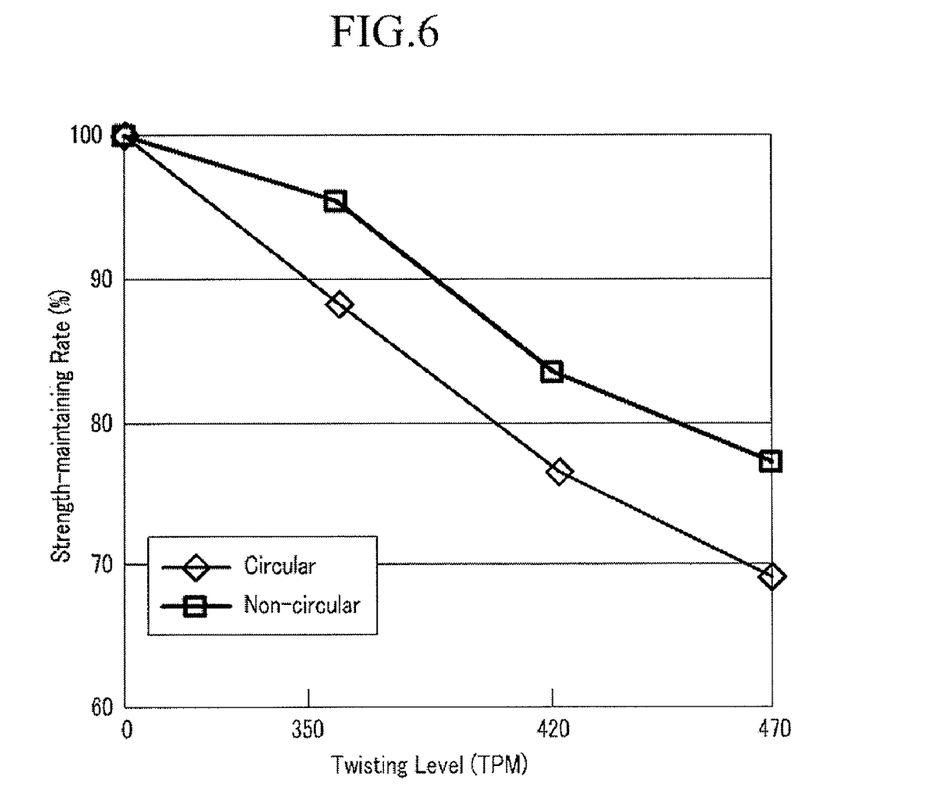
FIG. 6 is a graph showing the strength maintaining rate according to an increase of the twisting level (TPM) of the lyocell tire cords prepared by Examples 1 to 4 and Comparative Examples 1 to 4.

The strengths and the strength-maintaining rates of the tire cords prepared by Examples 1-4 and Comparative Examples 1-4 are listed in Table 1, and the change of the strength maintaining rate according to the increase of the twisting level (TPM) are presented in FIG. 6.

TABLE 1

| | Cross-section | Twisting level (TPM) | Strength (KGF) | Strength maintaining rate (%) |
|---|---|---|---|---|
| Example 1 | triangular | 0 | 19.3 | 100 |
| Example 2 | triangular | 350 | 18.4 | 95.3 |
| Example 3 | triangular | 420 | 16.1 | 83.4 |
| Example 4 | triangular | 470 | 14.9 | 77.2 |
| Comparative Example 1 | circular | 0 | 20.5 | 100 |

TABLE 1-continued

| | Cross-section | Twisting level (TPM) | Strength (KGF) | Strength maintaining rate (%) |
|---|---|---|---|---|
| Comparative Example 2 | circular | 350 | 18.1 | 88.3 |
| Comparative Example 3 | circular | 420 | 15.7 | 76.6 |
| Comparative Example 4 | circular | 470 | 14.2 | 69.3 |

As shown in Table 1 and FIG. 6, the strength maintaining rates of the tire cords of Examples 2 to 4 show a gentle decrease as the twisting level increases, but that of Comparative Examples 2 to 4 show a rapid decrease as the twisting level increases.

Figure 7:
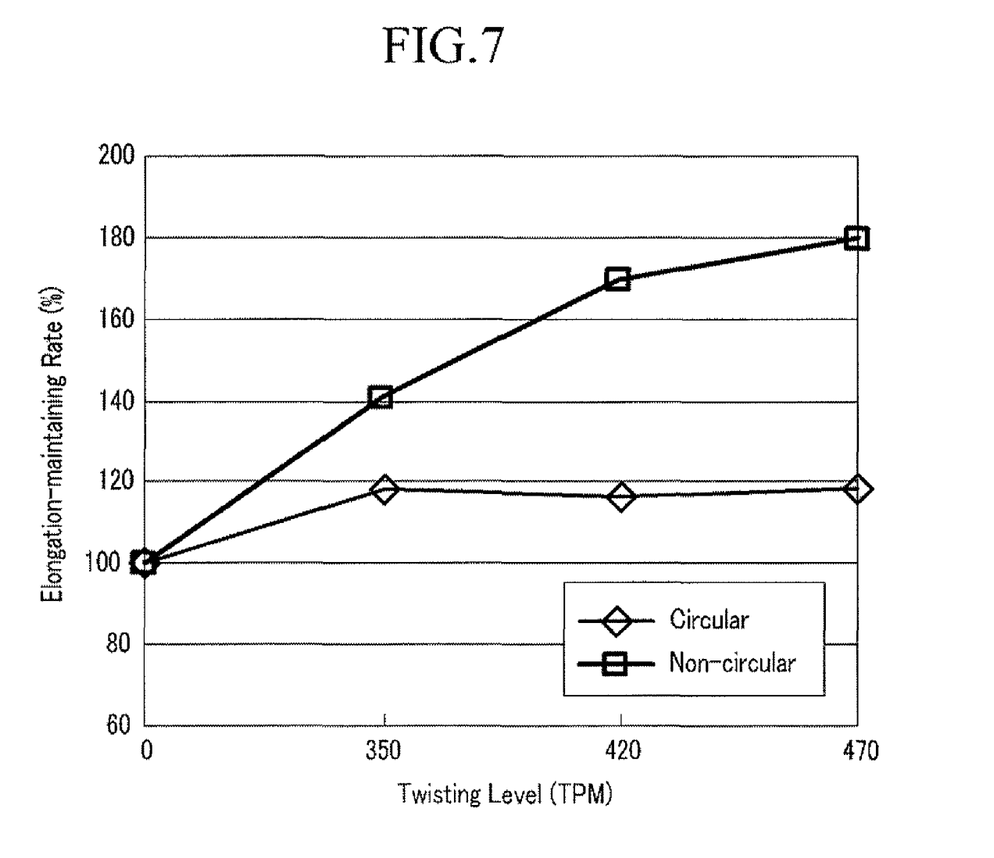
FIG. 7 is a graph showing the elongation maintaining rate according to an increase of the twisting level (TPM) of the lyocell tire cords prepared by Examples 1 to 4 and Comparative Examples 1 to 4.

Furthermore, the changes in the elongation and the elongation maintaining rates according to the increase of the twisting level of the tire cords prepared by Examples 1 to 4 and Comparative Examples 1 to 4 are listed in Table 2, and the change in the elongation maintaining rate according to the increase of the twisting level are presented in FIG. 7.

TABLE 2

| | Cross-section | Twisting level (TPM) | Elongation (%) | Elongation maintaining rate (%) |
|---|---|---|---|---|
| Example 1 | triangular | 0 | 4.6 | 100 |
| Example 2 | triangular | 350 | 6.5 | 141 |
| Example 3 | triangular | 420 | 6.8 | 170 |
| Example 4 | triangular | 470 | 7.2 | 180 |
| Comparative Example 1 | circular | 0 | 5.7 | 100 |
| Comparative Example 2 | circular | 350 | 6.7 | 118 |
| Comparative Example 3 | circular | 420 | 6.6 | 116 |
| Comparative Example 4 | circular | 470 | 6.7 | 118 |

As shown in Table 2 and FIG. 7, it is known that the increase of the elongation according to the increase of the twisting level of the tire cords of Examples 2 to 4 is far higher than that of Comparative Examples 2 to 4.

It is known from the above results that the tire cords of the present invention show superior strength maintaining rates against twisting, and the elongation thereof is higher than the tire cords including the circular cross-section filaments.

As mentioned above, the reason for the small strength deterioration of the present tire cord is due to the non-circular cross-section filament having a larger surface area that is more appropriate for twisting compared to the circular cross-section fiber, and, particularly, it is due to the density (appearance density) of the non-circular cross-section filament bundle being increased as the twisting level increases.

The cellulose-based filament for a tire cord has advantages in that the strength deterioration due to twisting is remarkably low and the elongation is improved, and thus the fatigue resistance is good.

What is claimed is:

1. A cellulose-based filament for a tire cord, wherein the cellulose-based filament satisfies the following Equation 1:

$$1 < R2/R1 \leq 3 \qquad \text{Equation 1}$$

wherein R1 is a radius of a maximum inscribed circle of a cross-section of the filament, and R2 is a radius of a minimum circumscribed circle of the cross-section of the filament, and R2/R1 defines a cross-section shape deviation expressed as a modification ratio ("MR"); and wherein a dipped cord formed of twisted 2-3 plies of bundles including a plurality of the cellulose-based filaments, in which the filaments are twisted to have S twisting and Z twisting levels of 470 TPM, respectively, have an elongation which is 120% or greater than the elongation of a dipped bundle which is formed of a same total number of the cellulose-based filaments as the dipped cord without a twisting (0 TPM).

2. The cellulose-based filament according to claim 1, wherein the elongation of the dipped cord is 140% or greater than the elongation of the dipped bundle.

3. The cellulose-based filament according to claim 2, wherein and the elongation of the dipped cord is 160% or greater than the elongation of the dipped bundle.

4. The cellulose-based filament according to claim 1, wherein a dipped cord formed of twisted 2-3 plies of bundles including a plurality of the cellulose-based filaments, in which the filaments are twisted to have S twisting and Z twisting levels of 420 TPM, respectively, have an elongation which is 120% or greater than the elongation of a dipped bundle which is formed of a same total number of the cellulose-based filaments as the dipped cord without a twisting (0 TPM).

5. The cellulose-based filament according to claim 4, wherein the elongation of the dipped cord is 140% or greater than the elongation of the dipped bundle.

6. The cellulose-based filament according to claim 5, wherein the elongation of the dipped cord is 160% or greater than the elongation of the dipped bundle.

7. The cellulose-based filament according to claim 1, wherein a dipped cord formed of twisted 2-3 plies of bundles including a plurality of the cellulose-based filaments, in which the filaments are twisted to have S twisting and Z twisting levels of 350 TPM, respectively, have an elongation which is 120% or greater than the elongation of a dipped bundle which is formed of a same total number of the cellulose-based filaments as the dipped cord without twisting (0 TPM).

8. The cellulose-based filament according to claim 7, wherein the elongation of the dipped cord is 140% or greater than the elongation of the dipped bundle.

9. The cellulose-based filament according to claim 1, wherein a dipped cord formed of twisted bundles including a plurality of the cellulose-based filament, in which the filaments are twisted to have S twisting and Z twisting levels of 470 TPM, respectively, have a strength which is 75% or greater than the strength of a dipped bundle which is formed of a same total number of the cellulose-based filaments as the dipped cord without twisting (0 TPM).

10. The cellulose-based filament according to claim 1, wherein a dipped cord formed of twisted bundles including a plurality of the cellulose-based filament, in which the filaments are twisted to have S twisting and Z twisting levels of 420 TPM, respectively, have a strength is which is 80% or greater than the strength of a dipped bundle which is formed of a same total number of the cellulose-based filaments as the dipped cord without twisting (0 TPM).

11. The cellulose-based filament according to claim 1, wherein a dipped cord formed of twisted bundles including a plurality of the cellulose-based filament, in which the filaments are twisted to have S twisting and Z twisting levels of 350 TPM, respectively, have a strength which is 90% or greater than the strength of a dipped bundle which is formed of a same total number of the cellulose-based filaments as the dipped cord without twisting (0 TPM).

12. The cellulose-based filament according to claim 1, further including a lyocell.

13. The cellulose-based filament according to claim 1, wherein the R2/R1 value is in the range of 1.1 to 3.

14. The cellulose-based filament according to claim 13, wherein the R2/R1 value is in the range of 1.3 to 2.5.

15. The cellulose-based filament according to claim 1, wherein the filament is a non-circular cross-section filament having a substantially triangular cross-section.

16. The cellulose-based filament according to claim 1, wherein the single filament fineness of the cellulose-based filament is in the range of 0.8 to 6 denier.

17. The cellulose-based filament according to claim 1, wherein the total number of filaments of the bundle including the cellulose-based filaments is in the range of 200 to 2000.

18. The cellulose-based filament according to claim 17, wherein the total fineness of the bundle including the cellulose-based filaments is in the range of 200 to 3000 denier.

19. A bundle for a tire cord including the cellulose-based filament according to claim 1, wherein the total number of filaments included therein is in the range of 200 to 2000.

20. The bundle for a tire cord according to claim 19, wherein the total fineness is in the range of 200 to 3000 denier.

21. The bundle for a tire cord according to claim 20, wherein the total fineness is in the range of 500 to 2500 denier.

22. The bundle for a tire cord according to claim 19, including 2 or more kinds of filaments each formed of a different polymer from the other filaments.

23. The bundle for a tire cord according to claim 19, including 2 or more kinds of filaments, each filament having a different cross-section shape deviation represented by the following Equation 1 from the other filaments:

$$MR = R2/R1 \qquad \text{Equation 1}$$

wherein MR is a cross-section shape deviation expressed as a modification ratio, R1 is a radius of a maximum inscribed circle of a cross-section of the filament, and R2 is a radius of a minimum circumscribed circle of the cross-section of the filament.

24. The bundle for a tire cord according to claim 19, including 2 or more kinds of filaments, each having a different cross-sectional shape from the other.

25. A twisted yarn for a tire cord including the cellulose-based filaments according to claim 1, wherein the total number of filaments included therein is in the range of 400 to 6000.

26. The twisted yarn for a tire cord according to claim 25, wherein the total fineness is in the range of 400 to 9000 denier.

27. The twisted yarn for a tire cord according to claim 26, wherein the total fineness is in the range of 1000 to 7500 denier.

28. The twisted yarn for a tire cord according to claim 25, including 2 or more kinds of filaments, each filament is formed of a different polymer from the other filaments.

29. The twisted yarn for a tire cord according to claim 25, including 2 or more kinds of filaments, each filament having a different cross-section shape deviation represented by the following Equation 1 from the other filaments:

$$MR = R2/R1 \qquad \text{Equation 1}$$

wherein MR is a cross-section shape deviation expressed as a modification ratio, R1 is a radius of a maximum inscribed circle of a cross-section of the filament, and R2 is a radius of a minimum circumscribed circle of the cross-section of the filament.

30. The twisted yarn for a tire cord according to claim 25, including 2 or more kinds of filaments, each filament having a different cross-sectional shape from the other filaments.

31. The twisted yarn for a tire cord according to claim 25, wherein the twisted yarn is prepared by first Z twisting or S twisting bundles including the cellulose-based filaments and second S co-twisting or Z co-twisting 2 to 3 plies of the twisted bundles together, and wherein the total number of the cellulose-based filaments in the bundle is in the range of 200 to 2000.

32. The twisted yarn for a tire cord according to claim 25, wherein the twisting levels of the first Z twisting or S twisting and the second S co-twisting or Z co-twisting are in the range of 200 to 600 TPM, respectively.

33. The twisted yarn for a tire cord according to claim 32, wherein the twisting angle from the perpendicular direction to the vertical direction of the twisted yarn is in the range of 30 to 55°.

34. A tire cord including twisted yarns, wherein each of the twisted yarns includes 2 or more kinds of filaments, each filament having a different cross-section shape deviation represented by the following Equation 1 from the other filaments;

$$MR = R2/R1 \qquad \text{Equation 1}$$

wherein MR is a cross-section shape deviation expressed as a modification ratio, R1 is a radius of a maximum inscribed circle of a cross-section of the filament, and R2 is a radius of a minimum circumscribed circle of the cross-section of the filament; and wherein the twisted yarns are prepared by first Z twisting or S twisting a bundle comprising the 2 or more kinds of filaments and second S co-twisting or Z co-twisting 2 to 3 ply of the resulting twisted bundles together.

35. The tire cord according to claim 34, wherein the total fineness of the twisted yarn is in the range of 400 to 9000 denier.

36. The tire cord according to claim 35, wherein the total fineness of the twisted yarn is in the range of 1000 to 7500 denier.

37. The tire cord according to claim 34, wherein each of the twisted yarns includes 2 or more kinds of filaments, each filament having a different cross-sectional shape from other filaments.

38. The tire cord according to claim 34, wherein the twisting level of the first Z twisting or S twisting and the second S co-twisting or Z co-twisting are in the range of 200 to 600 TPM, respectively.

39. The tire cord according to claim 38, wherein the twisting angle from the perpendicular direction to the vertical direction of the twisted yarn is in the range of 30 to 55°.

40. The tire cord according to claim 34, having a tensile strength of 12 kgf to 60 kgf.

* * * * *